United States Patent [19]
Khoury et al.

[11] Patent Number: 5,923,010
[45] Date of Patent: Jul. 13, 1999

[54] AUTOMOTIVE STEERING COLUMN SWITCH

[75] Inventors: Josef Elias Khoury, Farmington Hills, Mich.; Roland Rügenberg, Bingen, Germany

[73] Assignee: Eaton Corporation, Cleveland, Ohio

[21] Appl. No.: 09/049,844

[22] Filed: Mar. 27, 1998

[51] Int. Cl.⁶ .................................................. H01H 3/16
[52] U.S. Cl. ...................................... 200/61.27; 200/61.35
[58] Field of Search .............................. 200/61.27, 61.3, 200/61.31, 61.32, 61.33, 61.34, 61.35, 61.36, 61.39

[56] References Cited

FOREIGN PATENT DOCUMENTS

| 35 10345 C1 | 11/1985 | Germany | 200/61.27 |
| 35 02651 A1 | 7/1986 | Germany | 200/61.27 |
| 35 32668 C1 | 7/1986 | Germany | 200/61.35 |

Primary Examiner—M. L. Gellner
Assistant Examiner—Nhung Nguyen
Attorney, Agent, or Firm—Roger A. Johnston

[57] ABSTRACT

An automotive steering column switch comprises a turn signal switch (1) whose turn signal lever (7) is pivotable about a pivot (6) arranged on the switch housing (5) of the turn signal switch (1) and the end section (8) of which switch, on the housing side, is equipped with a spring-loaded locking element (11). The locking element (11) coacts with a locking-follower track (19) formed on the switch housing (5) and is in mesh with a release (16) mounted on the switch housing (5) and serving to reset the turn signal lever (7). To reduce the manufacturing and assembly expense, the release (16) has a follower track (26) on which bears in sliding fashion the spring-loaded locking element (11) of the turn signal lever (7), has a sliding element (31) which coacts in sliding manner with a guide element (33) formed on the end section (8) of the turn signal lever (7), and has two mutually spaced lateral recesses (37) adapted to engage corresponding lugs (40) formed on the switch housing (5).

16 Claims, 4 Drawing Sheets

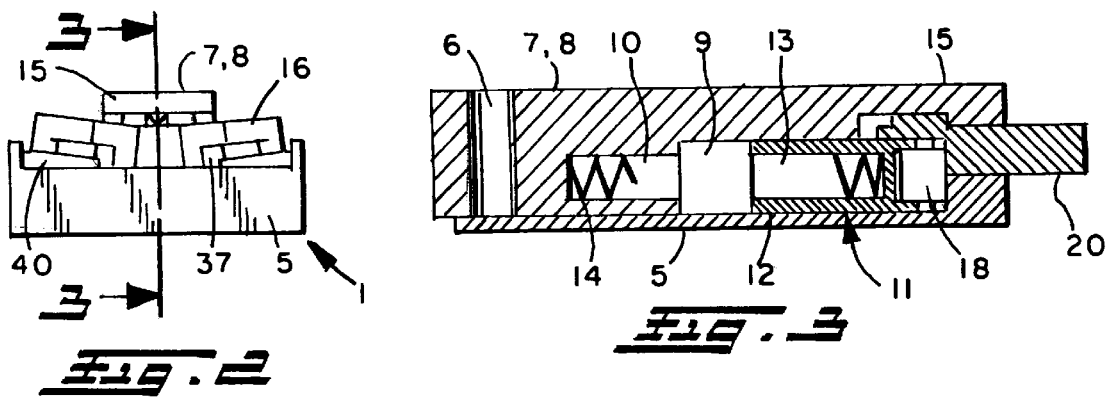
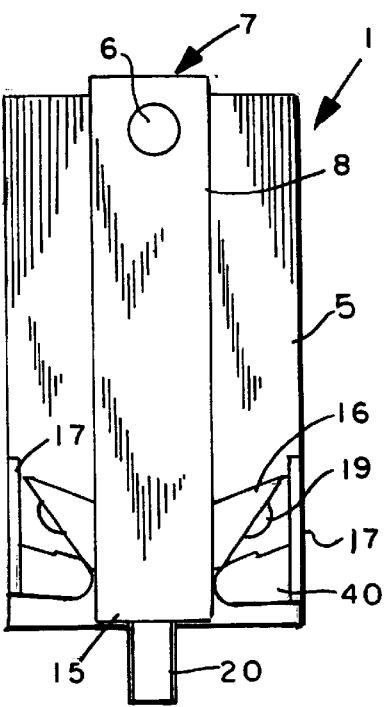
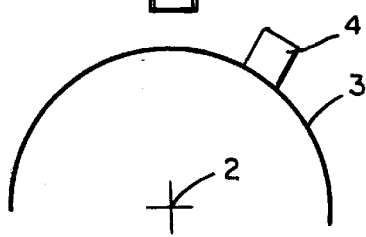
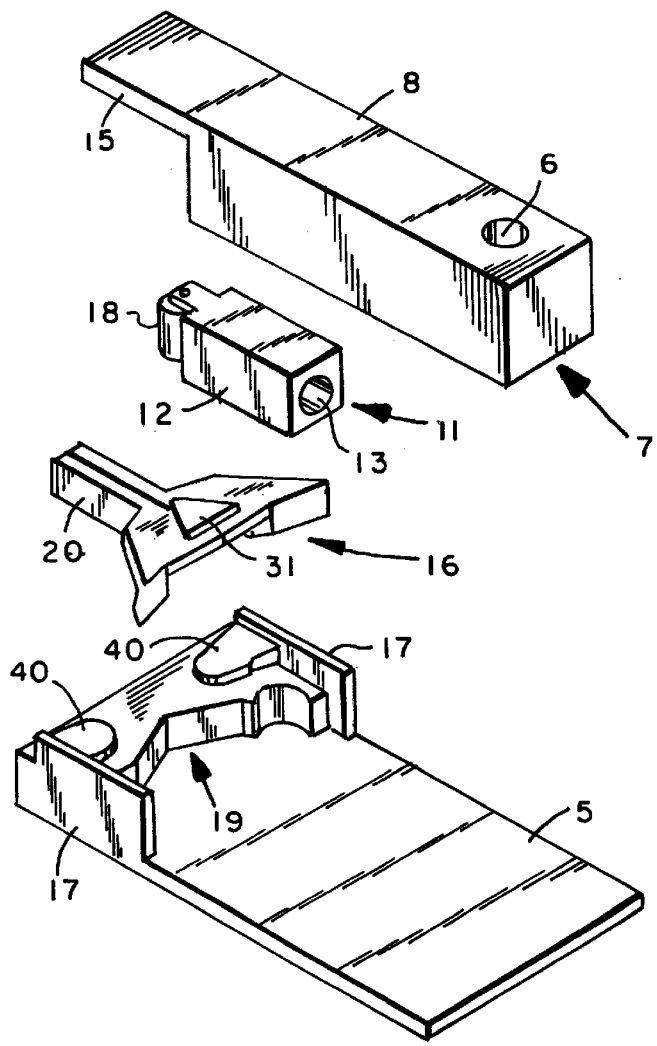

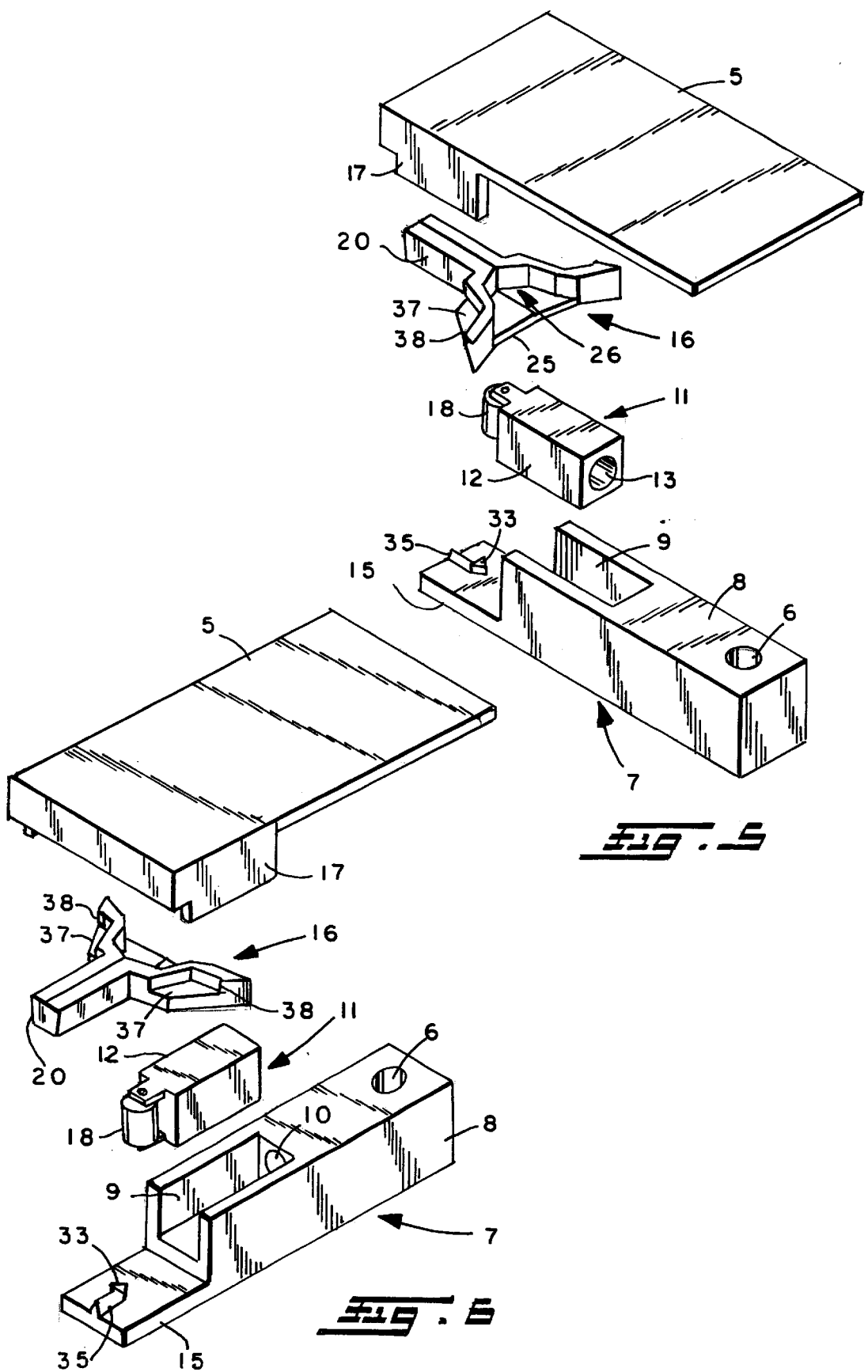

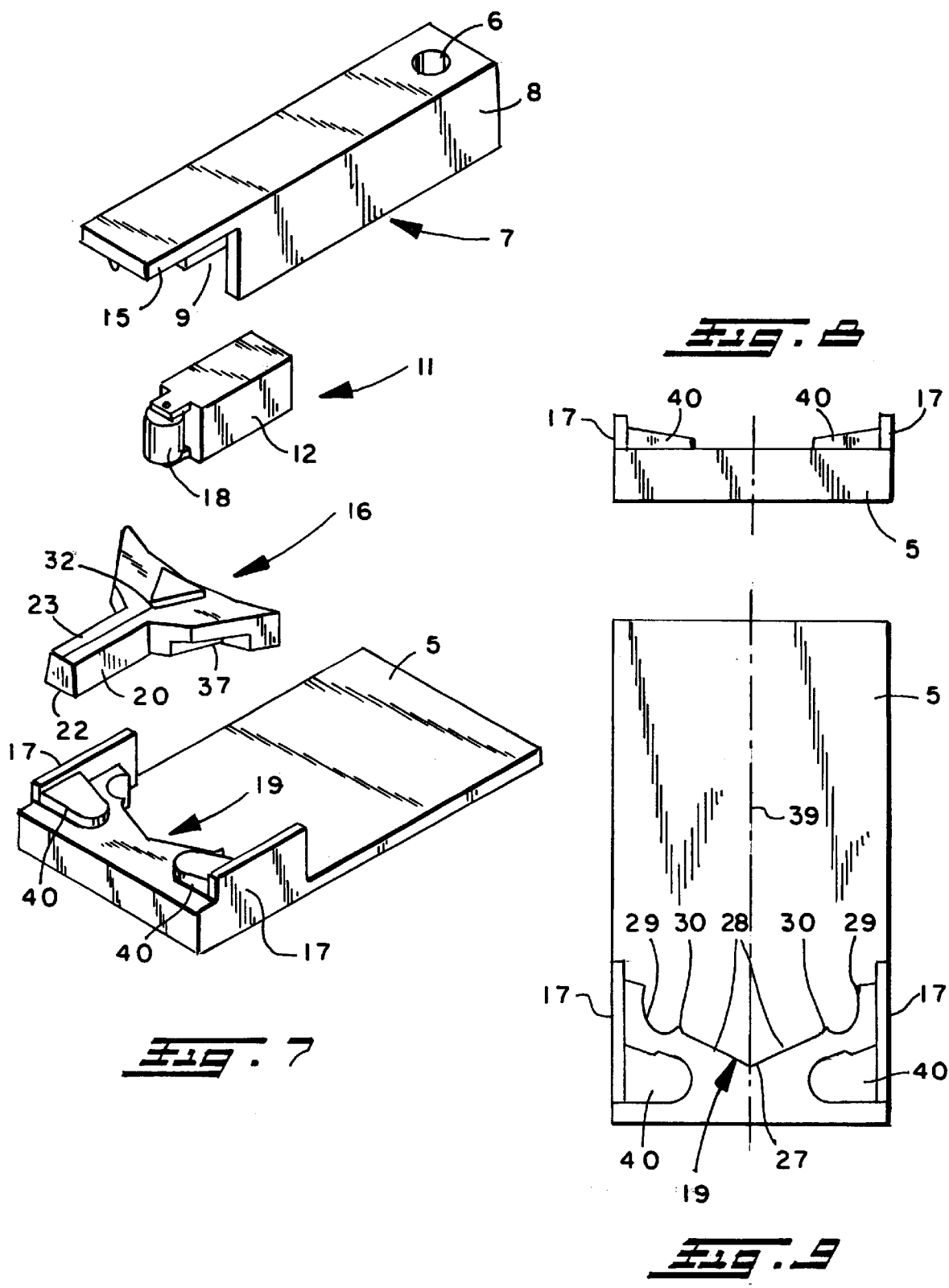

AUTOMOTIVE STEERING COLUMN SWITCH

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

Automotive steering column switches typically have turn signal switches equipped with a turn signal lever. The turn signal lever is movable by light actuation from the "OFF" position to the tipping positions adjacent to the "OFF" position, for the "Right"/"Left" turn signals, and upon release the turn signal is restored automatically to the "OFF" position. A heavier actuation of the turn signal lever to the "Right"/"Left" turn signal positions causes the turn signal lever to lock in the respective position. As the steering wheel is turned in the proper direction corresponding to the relevant turn signal lever position and the desired turning direction, the turn signal lever remains in this position until the steering wheel is turned again in the opposite direction.

The automatic resetting of the turn signal lever as the steering wheel is turned back from the desired turn signal lever position is brought about by a driver molded to the steering wheel spindle, which driver engages a release arranged in the turn signal switch.

Known from DE 31 46 271 C2 is an automotive steering column switch with reset, notably a turn signal switch, which in a housing features a guide element arranged radially relative to the steering column and spring-loaded toward the steering column by a compression spring. A release is mounted displaceably and rotatably in the guide element and kept aligned toward the steering column by means of a spring system. The spring system is attached with its one end to the release and with its other end to the guide element. A tapered section is arranged on the end of the release near the steering column, and engages a driver on the steering column as the driver turns opposite to the turning direction selected by setting the turn signal lever. Coacting with one another, further components are actuated in the process, causing, in the respective locking mechanism, a resetting of the turn signal lever to "OFF" position. Once the driver disengages the release after meshing with it, the spring system attached to the housing of the turn signal switch and to the release restores the release to its home position, aligned on the axis of the steering column.

Known, furthermore, is a locking-follower track for holding the turn signal lever in the "Right"/"Left" turn signal positions, the turn signal lever being equipped with a spring-loaded locking-follower roller that glides along the follower track.

A particular disadvantage with these prior constructions is the need for a great many individual components that must be assembled, making the manufacturing expenditures and manufacturing costs very high. The assembled turn signal switch installed on the automotive steering column switch thus becomes very susceptible to malfunction. Wear and/or jamming of individual components frequently causes breakage of the release as the steering wheel is turned to its home position, so that an automatic resetting of the turn signal lever is no longer possible. The components used must be of very high quality and dimensionally precise, so as to limit the play of the locking elements relative to one another. The prior spring system has a high elasticity which, in conjunction with the play of the locking components, often leads to an unreliable release, or resetting, of the turn signal lever; jamming of the release occurs frequently.

BRIEF SUMMARY OF THE INVENTION

The invention relates to an automotive steering column switch comprising a turn signal switch whose lever is pivotable about a pivot arranged on the turn signal switch housing and whose end section on the housing side is equipped with a spring-loaded locking element which coacts with a locking-follower track formed on the switch housing and is in mesh with a release that is mounted pivotably on the switch housing, has a section tapering toward the steering column of the automobile and serves to reset the turn signal lever.

The invention provides an automotive steering column switch comprising a turn signal switch with a turn signal lever, of the initially named type, with few components which are functionally reliable and which provides a considerable reduction of the manufacturing costs and the production and assembly expense.

According to the invention, the release possesses:

- a follower track on which the spring-loaded locking element of the turn signal lever rests in a sliding manner,
- a gliding element which coacts in sliding manner with a guide element formed on the end section of the turn signal lever, and
- two mutually spaced lateral recesses that can be brought in mesh with corresponding lugs formed on the switch housing.

A particular advantage of the invention is that the release possesses a number of functional features, so that the release allows a single-piece and easy fabrication, for example, as a plastic form part. A majority of the features corresponding to the functional features of the release and able to mesh with these are formed in a housing part that allows single-piece fabrication, for instance, of plastic.

The spring-loaded locking element arranged on the turn signal lever engages, upon actuation of the latter, both the locking-follower track formed on the switch housing and the follower track on the release, thereby causing the two tipping positions and the two turning direction positions "Right"/"Left". Moreover, as the spring-loaded locking element glides along the follower track of the release in coaction with the sliding element arranged on the release and with the guide element formed on the end section of the turn signal lever, a displacement of the release occurs in a radial direction relative to the steering column. In the turn signal lever movement to one of the tipping positions, the release rotates about a central point displacing the tapered section of the release in radial direction to the steering column only sufficiently far for the driver, arranged on the steering column, not to be able to engage the tapered section of the release. Hence, the steering wheel is, in the tipping positions of the turn signal lever, freely rotatable in both directions.

When actuating the turn signal lever to one of the "Right"/"Left" turning direction positions, the interaction of the sliding element on the release and the guide element on the end section of the turn signal lever causes a further displacement of the release in radial direction to the steering column, until the spring-loaded locking element of the turn signal lever engages a locking position of the follower track formed on the switch housing. The release is now rotatable about a point near its respective outer lateral end on which pushes the end section of the turn signal lever. The opposite outer lateral end of the release is freely movable within a specific angular range, automatically causing the tapered section of the release to turn concomitantly. As the steering wheel is turned in the intended direction, the tapered section of the release undergoes a greater deflection, which prevents it from engaging the driver formed on the steering column. The angular range in which the release can turn is limited by the two mutually spaced side recesses arranged on the release and by their engaging the mating lugs on the switch housing. The displacement of the fulcrum of the release to its one side area, upon actuation of the turn signal lever, shifts the angular area asymmetrically in the direction opposite to the fulcrum of the release. Turning the steering wheel in the opposite direction causes the driver on the steering column to engage the tapered section of the release, forcing it to its home position. The turn signal lever thereby resets automatically to its home position, since the follower track formed on the release acts upon the spring-loaded catch of the turn signal lever. Since the sliding element on the release and the guide element on the end section of the turn signal lever slide now on one another in opposite direction, the release also restores automatically to its home position. The fulcrum of the release shifts again to its center.

In order to provide reliable sliding movement between the spring-loaded locking element and the follower track formed on the switch housing and of the follower track arranged on the release, the spring-loaded locking element is preferably configured as a locking-follower roller. Preference is given to arranging the locking-follower roller on a locking-slider block fitted in a guide channel protruding from the pivot of the switch housing and is spring-loaded with sliding movement by a compression spring arranged therein. Such spring-loaded locking-slider block produces a reliable sliding movement with optimum play in the guide channel of the turn signal lever.

To enable the various switching positions of the turn signal lever, the follower track formed on the switch housing has a center follower track area for the "OFF" position, follower track areas for the tipping positions that border on both sides on the center follower track area, and outer follower track areas provided with rises for the turning positions of the turn signal lever bordering thereon. Thus, the locking-follower track is slightly V-shaped, the outer ends of the V-shape shanks being provided with the catch recesses for the turn signal lever positions "Right"/"Left".

A further embodiment of the invention provides for the locking-follower track on the switch housing to have a height amounting to about one-half the height of the follower roller resting on it. To enhance the effect of the follower roller and utilize it completely, its other half engages the follower track formed on the release, the height of which corresponds thus to about one-half the height of the follower roller resting on it.

To enable the engagement with the follower roller and its sliding movement, the follower track formed on the release extends along the rear end wall away from its tapered section. The spring-loaded locking-follower roller arranged on the slider block engages thus both the locking-follower track on the switch housing and the follower track on the release, the interaction of which produces the mode of operation explained before.

The follower track of the release is essentially V-shaped and symmetric, each shank of the V-shape having a disuniform pattern of curvature. The follower track is symmetric but has on its shanks a disuniform pattern of curvature, which in conjunction with the spring-loaded follower roller effects the pivotability of the release.

According to a further development of the invention, a first provision calls for molding the sliding element formed on the release to its top side in the form of a driver and giving it an essentially triangular shape, with one vertex of the triangular shape pointing toward the tapered section of the release. A further provision calls for molding, in the form of a driver, the guide element found on the end section of the turn signal lever to a projection of the turn signal lever end section which at least in part overlaps the release, and the guide element has an essentially triangular shape, with one vertex of the triangular shape pointing to the vertex of the triangular shape of the sliding element formed on the release.

In the home position of the automotive steering column switch, with the turn signal lever in the "OFF" position, the vertex of the triangular shapes of the driver-like sliding element and guide element are directly opposed. Thus, the sliding element on the release and the guide element on the end section of the turn signal lever are, in the "OFF" position of the latter, not engaged. Only when the turn signal lever is pivoted in one direction is the release forced in the direction of the steering column, due to the coaction of the spring-loaded follower roller and the follower track of the release, causing the sliding element of the release and the guide element of the turn signal lever end section to engage. Pointing to one another, the vertices of the triangular shapes of the sliding element and of the guide element thus slide past one another, their adjoining side surfaces sliding on one another and the triangular shapes forcing a further movement of the release in direction radial to the steering column.

In developing the invention further, the lugs formed on the switch housing are each inclined toward the longitudinal axis of the switch housing, so as to form essentially a V-shape, with the tapered section of the release movable between said lugs. Thus, the lugs are formed on opposite sides of the switch housing, the area between the lugs serving as support surface for the tapered section of the release, on which surface the release moves in a pivoting and shifting manner.

Furthermore, the bottom surface and the top surface of the tapered section of the release are angled about the longitudinal axis of the latter with a slight V-shape, with the bottom surface and the top surface extending parallel to each other. The ridge formed by the angled bottom surface of the tapered section of the release is intended as a fulcrum for the release on its support surface on the switch housing. Upon actuation of the turn signal lever to one of the "Right"/"Left" turning positions, the release toggles about the fulcrum formed on the bottom side of the tapered section; and, the fulcrum of the release relocates at the same time to the side on which the end section of the turn signal lever acts. As a result, the relevant recess on the release engages the corresponding lug on the switch housing, thereby limiting the pivotal movement of the release to a specific angular range.

Each of the outer side edges of the recesses on the release features a driver-like rise which aids the recess provided on the release in engaging the corresponding lugs on the switch housing.

To further limit the movement of the release, the switch housing has in the actuation range of the release an outer lateral bounding wall.

The invention provides an automotive steering column switch consisting of few components and comprising a turn signal switch with a turn signal lever, wherein the components are preferably of plastic and, thus, can often be produced in a single operation, for example, by injection molding. Furthermore, the turn signal switch is characterized by a considerably lower assembly expense and high reliability.

BRIEF DESCRIPTION OF THE DRAWINGS

The invention is more fully explained hereafter on an exemplary embodiment with reference to the pertaining drawings, which show in FIG. 1, a plan view of the inventional automotive steering column switch with turn signal switch and turn signal lever;

FIG. 2, a side elevation of the automotive steering column switch according to FIG. 1;

FIG. 3, a section along line A—A according to FIG. 2;

FIGS. 4 through 7, exploded views of the inventional automotive steering column switch with turn signal switch and turn signal lever in various directions of view;

FIG. 8, a front view of the switch housing;

FIG. 9, a view of the switch housing according to FIG. 8;

DETAILED DESCRIPTION OF THE INVENTION

Figure 10:
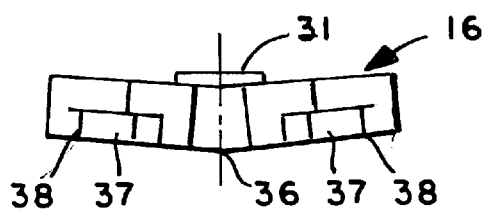
FIG. 10, a front elevation of the release.
Figure 11:
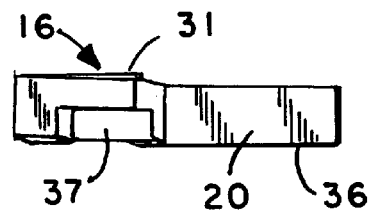
FIG. 11, a side elevation of the release according to FIG. 10.
Figure 12:
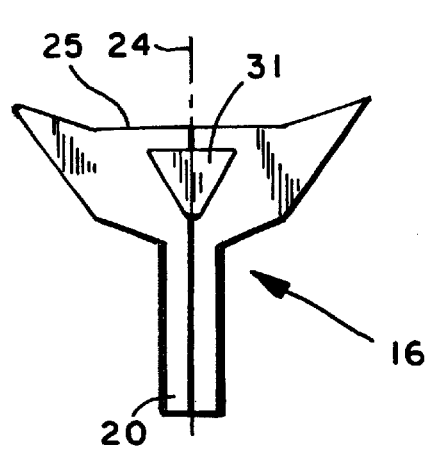
FIG. 12, a plan view of the release according to FIG. 10.
Figure 13:
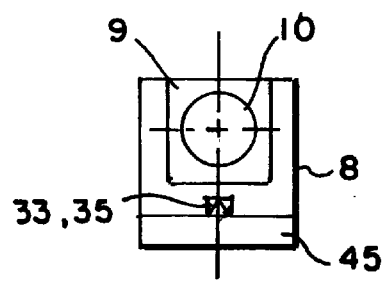
FIG. 13, a rear view of the end section of the turn signal lever.
Figure 14:
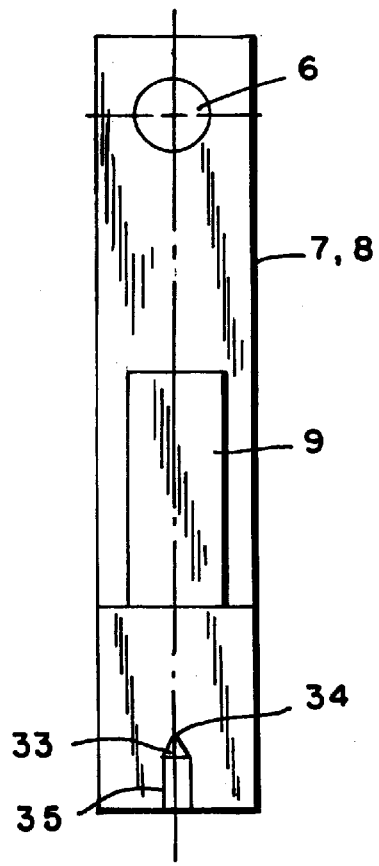
FIG. 14, a bottom view of the end section of the turn signal lever according to FIG. 13.

The turn signal switch 1 is secured to a not illustrated automotive steering column switch, and is arranged, according to FIG. 1, radially to the longitudinal axis 2 of the schematically illustrated steering column 3, which latter is equipped on its outer periphery with at least one driver 4. The turn signal switch 1 includes a pedestal-like switch housing 5.

An end section 8 of a turn signal lever 7 has a pivot surface in the form of bore 6 formed therein and is provided, in its longitudinal direction, with a guide channel 9 which extends in a blind hole 10 formed in the end of channel 9 as shown in FIG. 6. Fitted in the guide channel 9, so as to be slidable, is a locking-slider block 12 indicated generally as a locking element 11, the block 12 being provided in its longitudinal direction as well with a blind hole 13. Resting on the respective end walls of the blind holes 10, 13, a compression spring 14 extends through the blind hole 10 of the end section 8 of the turn signal lever 7 up to the blind hole 13 in the locking-slider block 12.

The end of end section 8 of the turn signal lever 7, away from the pivot surface 6, has a projection 15 which, in the "OFF" position of the turn signal lever 7, protrudes radially to the steering column 3, surmounting in part the locking element 11 and a release indicated generally at 16 arranged between the projection 15 and the switch housing 5.

The switch housing 5 has disposed in its front area, opposing lateral bounding walls 17 between which the release 16 is movable.

Configured as locking element 11, the locking-slider block 12 comprises a locking-follower roller 18 which is mounted on the end of the locking-slider block 12 near the steering column 3 so as to be freely rotatable. Said locking-follower roller 18 engages both the rear end of the release 16 and a locking-follower track indicated generally at 19 formed on the switch housing 5, which will be explained later.

The release 16 has a tapered section 20 on its front end, which in the "OFF" position of the turn signal lever 7 is near the steering column 3, and which is movable on a support surface 21 of the switch housing 5. This tapered section 20 of the release 16 serves to engage the driver 4 on the steering column 3. The bottom surface 22 and the opposite top surface 23 of the tapered section 20 of the release 16 are slightly angled in V-fashion about the latter's longitudinal axis so that the bottom surface 22 and the top surface 23 extend parallel to each other. The release 16 itself is essentially Y-shaped as shown in FIGS. 4 through 7.

A follower track indicated generally at 26 is formed on the rear end wall 25 of the release 16 is and has an approximately V-shaped form, with the shanks of the V-shape extending disuniformly. Follower track 26 is in contact with the locking-follower roller 18 of the locking element 11. The height of the follower track 26 equals about one-half the height of the locking-follower roller 18. The other half-height of the locking-follower roller 18 engages a locking-follower track indicated generally at 19 formed in the switch housing 5, its height equaling as well about one-half the height of the locking-follower roller 18.

The locking-follower track 19 has a center follower track area 27 for the "OFF" position of the turn signal lever 7 and, bordering it on both sides, follower track areas 28 for the "Right"/"Left" tipping positions of the turn signal lever 7 and, bordering again thereon, outer follower track areas 29 for the "Right"/"Left" turn signal lever positions intended for retaining the locking-follower roller 18 of the locking element 11. Slight rises or bumps 30 are formed in the transition areas from the follower track areas 28 to the follower track areas 29, which require a certain tactile resistance for the locking-follower roller 18 to surmount upon actuation of the turn signal lever 7.

A triangular sliding portion or element 31 formed in relief on the top side of the release 16 is its vertex 32 pointing toward the tapered section 20.

A projection 15 of end section 8 of the turn signal lever 7 has an essentially triangular guide element 33 whose vertex 34 is in the "OFF" position of the turn signal lever 7, disposed near the vertex 32 of sliding portion or element 31 of the release 16. Upon actuation of the turn signal lever 7, the sliding portion or element 31 on the release 16 and the guide element 33 on the end section 8 of turn signal lever 7 slide past each other, moving the release 16 in radial direction to the steering column 3. Moreover, the guide element 33 with a driver 35 is able to toggle, for a toggle movement of the release 16, about the latter's ridge 36 formed on the bottom surface 22 on the tapered section 20.

The release 16 possesses, on each side, a recess 37 whose outer end is provided with a rise 38. Coinciding with said recesses 37, on both sides of the longitudinal axis 39 of switch housing 5, are lugs 40 inclined thereto and bordering on the bounding walls 17 of the switch housing 5. Upon actuation of the turn signal lever 7, lugs 40 engage in sliding manner, the recesses 37 in the release 16, with the rises or humps 38 on the recesses 37 of the release 16 sliding on the sidewalls of the lugs 40 of the switch housing 5. In response, the release 16 proceeds to a position slightly tilted about the ridge 36 on the bottom surface 22 of the tapered section 20.

It is understood that the above features are usable not only in the described combination, but also in other combinations or by themselves, without leaving the scope of the present invention.

We claim:

1. Automotive steering column switch comprising a turn signal switch whose turn signal lever is pivotable about a pivot arranged on the switch housing of the turn signal switch and whose end section on the housing side is equipped with a spring-loaded locking element which coacts with a locking-follower track formed on the switch housing and with a release mounted pivotably on the switch housing and having a section tapering toward the steering column of the automobile, serving to reset the turn signal lever, characterized in that the release comprises a follower track on which bears in sliding manner the spring-loaded locking element of the turn signal lever, a sliding element which in sliding manner coacts with a guide element formed on the end section of the turn signal lever, and two lateral recesses spaced relative to each other, which can engage lugs formed on the switch housing.

2. Automotive steering column switch according to claim 1, characterized in that the spring-loaded locking element is configured as a locking-follower roller.

3. Automotive steering column switch according to claim 1, characterized in that the locking-follower roller is arranged on a slidable locking-slider block fitted in a guide channel that is formed in the end section of the turn signal lever which from the pivot of the switch housing protrudes into said locking-slider block being loaded in slidably movable manner by a compression spring arranged therein.

4. Automotive steering column switch according to claim 1, characterized in that the locking-follower track formed on the switch housing has a center follower track area for the "OFF" position, follower track areas bordering on both sides on the center follower track area and intended for the tipping positions, and outer follower track areas bordering thereon and provided with rises and intended for the turn signal switching positions of the turn signal lever.

5. Automotive steering column switch according to claim 1, characterized in that the locking-follower track on the switch housing has a height amounting to about one-half the height of the locking-follower roller bearing on it.

6. Automotive steering column switch according to claim 1, characterized in that the follower track formed in the release extends along a wall away from its tapered section.

7. Automotive steering column switch according to claim 1, characterized in that the follower track of the release is essentially V-shaped and symmetric, each shank of the V-shape having a disuniform pattern of curvature.

8. Automotive steering column switch according to claim 1, characterized in that the follower track of the release has a height equaling about one-half the height of the locking-follower roller bearing on it.

9. Automotive steering column switch according to claim 1, characterized in that the sliding element formed on the release is molded after the fashion of a cog to its top side and has an essentially triangular shape, a vertex of the triangular shape pointing to the tapered section of the release.

10. Automotive steering column switch according to claim 1, characterized in that the guide element formed on the end section of the turn signal lever is molded after the fashion of a driver to a projection of the end section of the turn signal lever, said projection overlapping at least partly the release, said guide element having essentially triangular shape, with a vertex of the triangular shape directed to oppose the vertex of the triangular shape of the sliding element formed on the release.

11. Automotive steering column switch according to claim 1, characterized in that the vertices of the triangular shapes of the sliding element and the guide element are in the "OFF" position of the turn signal lever disposed directly opposite.

12. Automotive steering column switch according to claim 1, characterized in that the lugs formed on the switch housing are inclined each toward the switch housing so as to form essentially a V-shape, the tapered section of the release being movable between said lugs.

13. Automotive steering column switch according to claim 1, characterized in that a bottom surface and a top surface of the tapered section of the release are each angled, slightly V-shaped, the bottom surface and the top surface extending parallel to each other.

14. Automotive steering column switch according to claim 1, characterized in that a ridge is formed by the angled bottom surface of the tapered section of the release and is intended as a fulcrum for the release on its support surface on the switch housing.

15. Automotive steering column switch according to claim 1, characterized in that each of the lateral recesses on the release has a driver-like rise.

16. Automotive steering column switch according to claim 1, characterized in that the switch housing features an outer lateral bounding wall.

* * * * *